Figure 1:
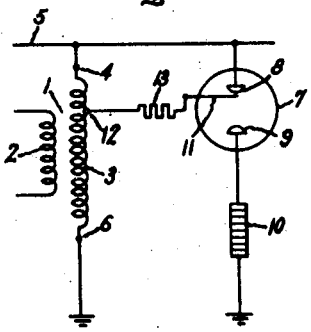

Dec. 21, 1948.  K. K. PALUEV  2,456,986

PROTECTIVE ARRANGEMENT FOR ELECTRICAL WINDINGS

Filed Feb. 12, 1945

Inventor:
Konstantin K. Paluev,
by Nancy E. Dunham
His Attorney.

Patented Dec. 21, 1948

2,456,986

UNITED STATES PATENT OFFICE 2,456,986

PROTECTIVE ARRANGEMENT FOR ELECTRICAL WINDINGS.

Konstantin K. Paluev, Pittsfield, Mass., assignor to General Electric Company, a corporation of New York Application February 12, 1945, Serial No. 577,543

13 Claims. (Cl. 175—294)

1

This invention relates to electrical protective systems and more particularly to improvements in the protection of electrical apparatus from the adverse effect of excessively rapid terminal voltage increases.

Examples of apparatus with which the invention is concerned are stationary electromagnetic induction apparatus, typically transformers, and dynamo-electric apparatus, in which the relative voltage-stress distribution within the apparatus, especially within a winding of the apparatus, is materially influenced by the character (aside from the magnitude) of the voltage which may be impressed across the terminals of the apparatus. For instance, if the impressed voltage is sinusoidal, its frequency may have a pronounced effect on the stress distribution, and if non-sinusoidal, its rate of rise may have such an effect. Generally, sinusoidal voltages of a low frequency or non-sinusoidal voltages of low rate of rise distribute themselves uniformly within the apparatus, while those of an increasingly high frequency or high rate of rise tend to distribute themselves increasingly non-uniformly. In the case of alternating voltages, resonance voltages also may be developed within the apparatus, making certain frequency bands very much more dangerous than higher frequencies.

The existence of these phenomena have been recognized in the prior art. Also, overvoltage protective devices, such as lightning arresters, have been developed which discriminate between higher and lower frequencies or rates of rise of impressed voltages and discharge the former types before they rise to the same levels as the latter. An invention of this type is described in United States Patent 2,089,555, issued to A. W. Hull et al. on August 10, 1937, and assigned to the assignee of the present invention. However, different apparatus in need of such frequency-selective protection require different allowance for different frequencies or rates of rise, and electrostatically unshielded apparatus may also have different resonance bands and therefore such protective devices of the prior art are poorly adapted to provide equally good protection to all such apparatus, for if the discharge device is less affected by increasing rates of rise than the protected apparatus, then the protection will be inadequate at the higher rates of rise; if more affected, then the operation at the higher frequencies will be false; and if resonance frequency bands exist in the apparatus, then the protection will be practically non-existent at those frequency bands. Furthermore, assuming that some

2 of these protective devices could be designed for a desired frequency-response characteristic within a limited range, the frequency-stress characteristics of the protected apparatus may either not be known, or not be known sufficiently accurately, or not be reproducible sufficiently accurately in the protective device.

In accordance with this invention the voltage stress distribution in the apparatus to be protected is itself used to actuate the protective device. Consequently, when this device is of the type described in the above-mentioned patent, the elements thereof which discriminate between higher and lower frequencies or rates of rise of impressed voltage are eliminated as the protected apparatus also performs the function of those elements, and also the operation is improved because the actuation of the device is directly responsive to the stress distribution in the protected apparatus and not to the voltage conditions of auxiliary elements which have no necessary relation to the particular apparatus protected.

An object of the invention is to provide a new and improved electrical protective system.

Another object of the invention is to provide a new and improved system for protecting electrical apparatus from the effect of excessive rapid increases in terminal voltage.

A further object of the invention is to provide improved overvoltage protection for electrical apparatus, in which the protective device automatically adjusts its selectivity for the discharging of overvoltages of different frequencies or rates of rise according to the characteristic individual needs of the protected apparatus.

The invention will be better understood from the following description taken in connection with the accompanying drawing and its scope will be pointed out in the appended claims.

Figure 2:
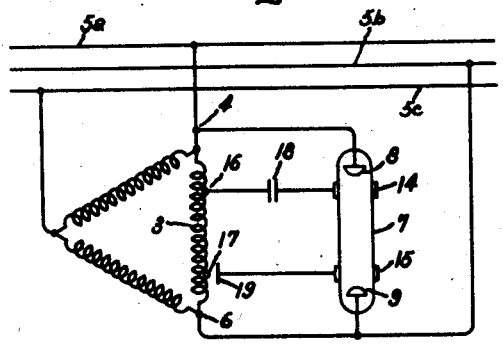

In the accompanying drawing Fig. 1 illustrates diagrammatically an embodiment of the invention, and Fig. 2 is a modification.

Referring now to Fig. 1, a transformer 1 is shown with low-voltage winding 2 and high-voltage winding 3, the latter to be protected. A terminal 4 of the high-voltage winding is connected to a high-voltage line 5, and the other terminal 6 is grounded. A discharge device 7, which may have the general construction described in the aforementioned patent, has a main electrode 8 connected to line 5, another main electrode 9 connected to ground through a suitable current-limiting resistor 10, and a trigger electrode 11 connected to a point 12 on winding 3 through an impedance element 13 which may be a resistance, or a reactance or a capacitance. It is known that abnormal voltages in a system are generally of a frequency or rate of rise much higher than the normal and cause a concentration of stress near the line end of the winding; therefore, if point 12 is chosen at a distance from 4 along the winding from, say, one to ten per cent of the winding length, and if the trigger 11 is appropriately positioned between the electrodes 8 and 9 based on the normal voltages of 4, 12, and 6, then a predetermined abnormal concentration of voltage between 4 and 12 will actuate device 7 by causing a spark to jump between 8 and 11 or by ionizing the gap space and thus initiate a discharge between 8 to 9 through 10 to ground. The impedance element 13, whether high or low, does not appreciably affect the initiation of the discharge but affects the magnitude of the power-fellow current tending to flow from 8 to 12 after the initiation of the discharge. It is advantageous to limit this current to a small value so that it will go out easily and not become a holding arc for the main power follow current flowing from 8 to 9, so that the latter also may go out easily after the overvoltage is discharged. The system, is however, operative without 13.

If a discharge device of the aforementioned type is used, the resistor 10 also is not indispensable and may even be left out to good advantage because it tends to build up a resistance-drop voltage under the high discharge current, and this voltage becomes impressed on the protected apparatus. As the purpose of resistance 10 is primarily to limit the power-follow current so as to facilitate the extinction of the arc after the discharge, therefore, if a resistance 10 is used, it may advantageously be made of a material having a negative resistance-current characteristic, such as material now in extensive use in lightning arrester practice, in order that the discharge path may offer a lower resistance to the discharge current and a higher resistance to the power-follow current.

The protective system of Fig. 1 is operative also when terminal 6 of the protected winding is isolated from ground, for, as well known in the art, even then the winding may be subject to a concentration of voltage under abnormal voltage conditions.

In apparatus in which the winding may have a resonant frequency with nodes and loops within the winding, it is advantageous, when practicable, to tap for 12 a point that will include between itself and 4 a considerable portion of a quarter wave length of such an oscillation, so as to excite the trigger electrode from a zone subject to greater voltage concentration. In most cases, it will be found sufficient to tap 12 at a point along the winding at a distance from 4 about 10% of the winding length or even less.

In Fig. 2 the winding 3 is isolated from ground as one phase of a delta-connected bank of windings fed from a three-phase system 5a, 5b, 5c, and the protection is shown as applied for overvoltages appearing between the lines instead of from line to ground. Thus, terminal 4 and electrode 8 are connected to line 5a, and terminal 6 and electrode 9 are connected to line 5b. The discharge device 7 is shown with two trigger electrodes, 14 and 15, one for each main electrode, and these trigger electrodes are electrostatically connected to corresponding symmetrical points 16 and 17 on the protected winding 3.

Unlike the trigger electrode 11 in Fig. 1, the trigger electrodes 14 and 15 in Fig. 2 are mounted outside the container for the main electrodes. However, they are in proper electrostatic relation to their respective main electrodes so that when the potential difference between them and their associated main electrodes increases sufficiently the intervening space will be ionized. Furthermore, instead of connecting the trigger electrodes conductively to the winding 3 as in Fig. 1, these electrodes are capacitively coupled to the winding 3. In the case of the electrode 14 a capacitor 18 is serially connected therebetween and a point 16 on the winding 3. In the case of the trigger electrode 15 a conducting plate 19 in proper electrostatic relation to a point 17 on the winding 3 is connected to the electrode 15. The size of the plate 19 and its spacing from the winding 3 are so arranged that with a predetermined voltage stress between the point 17 and the terminal 6 for the winding 3 the potential difference between main electrode 9 and trigger electrode 15 will be sufficient to cause discharge of the device 7.

The protection shown for one phase in Figs. 1 and 2 may of course be repeated for any other phase in a polyphase bank.

Although the invention has been described in terms of a transformer, it is evident that winding 3 may be that of a dynamo-electric machine just as well as that of a transformer so far as the application of the present invention to it is concerned.

While there have been shown and described particular embodiments of this invention, it will be obvious to those skilled in the art that various changes and modifications can be made therein without departing from the invention and therefore, it is aimed in the appended claims to cover all such changes and modifications as fall within the true spirit and scope of the invention.

What I claim as new and desire to secure by Letters Patent of the United States is:

1. An electrical protective system comprising, in combination, an electrical apparatus having an essential winding which is subject to different voltage-stress distributions for different types of voltages impressed across its terminals, a unitary overvoltage-discharge device having a pair of main discharge electrodes and an auxiliary electrode for controlling the discharge characteristics of said main electrodes for various types of voltages, electrical connections for applying to said discharge electrodes voltages to which said apparatus becomes subjected and certain of which it may become desirable to discharge, and an electrical connection between said auxiliary electrode and a point on said winding other than said terminals which is subject to substantial changes in voltage with respect to one of said terminals for varying types of voltages impressed across the terminals of said winding for causing said auxiliary electrode to initiate selective discharge between said main electrodes at lower levels of those terminal voltages which give rise to objectional voltage stresses within said apparatus.

2. A system as in claim 1 in which the point on said winding to which said auxiliary electrode is connected includes between itself and the nearest line terminal of said winding a small fraction of said winding.

3. A system as in claim 1 in which said point to which said auxiliary electrode is connected includes between itself and a terminal of said apparatus a substantial fraction of that portion of the winding of said apparatus which corresponds to a quarter wave length of a resonant frequency of said winding.

4. A system as in claim 1 in which said point on said winding includes between itself and the nearest line terminal of said winding a fraction up to 10% of said winding.

5. A system as in claim 1 in which an electrode of said discharge device is grounded.

6. A system as in claim 1 in which a terminal of said apparatus and an electrode of said discharge device are grounded.

7. A system as in claim 1 in which both said apparatus and said discharge device are isolated from ground.

8. A system as in claim 1 in which the circuit of said auxiliary electrode includes an impedance of a magnitude to cause a substantial limitation in the current of said electrode during a discharge.

9. In combination, electrical apparatus having a winding which is essential to the operation of said apparatus, the voltage stress distribution in said winding being a function of the time rate of increase of voltage across said winding, a unitary electric discharge device connected across said winding, a control electrode for said discharge device, and means for causing the voltage of said control electrode to follow the voltage of an intermediate point in said winding whereby the operation of said discharge device is responsive to the voltage stress distribution in said winding.

10. In combination, electrical apparatus having a circuit element to be protected against overvoltage, the voltage stress distribution in said circuit element being less and less uniform as the time rate of change of voltage across its terminals increases, unitary protective means for effectively discharging in one operation the voltage across the terminals of said circuit element, and means responsive to substantially the maximum voltage stress in said circuit element as distinguished from the average voltage stress in said circuit element or the total voltage across said circuit element for controlling the operation of said protective means.

11. The combination as in claim 10 in which the means responsive to substantially the maximum voltage stress in said circuit element is electrostatically coupled to said circuit element.

12. In combination, an electrical winding having a line terminal and a ground terminal, a lightning arrester comprising a highly evacuated envelope containing two main electrodes which are respectively connected to the terminals of said winding, a trigger electrode which is substantially nearer one main electrode than the other, and means for connecting said trigger electrode to an intermediate point in said winding.

13. In combination, an electrical winding having insulation of a predetermined voltage breakdown strength at a normal frequency, a unitary electric discharge device connected in shunt circuit relation with said winding, and means coupled to an intermediate point in said winding for rendering the impulse voltage breakdown strength of said discharge device independent of the normal frequency voltage breakdown strength of the insulation of said winding.

KONSTANTIN K. PALUEV.

REFERENCES CITED

The following references are of record in the file of this patent:

UNITED STATES PATENTS

| Number | Name | Date |
| --- | --- | --- |
| 745,379 | Pearson et al. | Dec. 1, 1903 |
| 1,477,303 | Allcutt | Dec. 11, 1923 |
| 1,477,305 | Allcutt | Dec. 11, 1923 |
| 1,962,062 | Evans | June 5, 1934 |
| 2,089,555 | Hull et al. | Aug. 10, 1937 |
| 2,192,028 | Bedford | Feb. 27, 1940 |